US012561649B2

(12) United States Patent
Zou et al.

(10) Patent No.: US 12,561,649 B2
(45) Date of Patent: Feb. 24, 2026

(54) METHOD, DEVICE AND STORAGE MEDIUM FOR CONSTRUCTING REQUIREMENT BEHAVIOR TREE

(71) Applicant: Siemens Aktiengesellschaft, Munich (DE)

(72) Inventors: Wen Chao Zou, Shanghai (CN); You Hua Tang, Shanghai (CN); Shao Tu Jia, Fuxin (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 19/099,187

(22) PCT Filed: Jul. 29, 2022

(86) PCT No.: PCT/CN2022/109201
§ 371 (c)(1),
(2) Date: Jan. 28, 2025

(87) PCT Pub. No.: WO2024/021105
PCT Pub. Date: Feb. 1, 2024

(65) Prior Publication Data
US 2025/0259142 A1 Aug. 14, 2025

(51) Int. Cl.
*G06Q 10/0875* (2023.01)
*G06Q 10/0631* (2023.01)

(52) U.S. Cl.
CPC ... *G06Q 10/0875* (2013.01); *G06Q 10/06315* (2013.01)

(58) Field of Classification Search
None
See application file for complete search history.

(56) References Cited

U.S. PATENT DOCUMENTS 10,043,222 B1 8/2018 Bromley
2018/0053104 A1 2/2018 Teplinsky
(Continued)

FOREIGN PATENT DOCUMENTS

CN 109583684 A 4/2019

OTHER PUBLICATIONS

Search Report for International Application No. PCT/CN202/109201, 10 pages, Jan. 3, 2023.
(Continued)

*Primary Examiner* — Mohammad Ali
*Assistant Examiner* — Saad M Kabir
(74) *Attorney, Agent, or Firm* — Slayden Grubert Beard PLLC

(57) ABSTRACT

Various embodiments of the teachings herein include methods for constructing a requirement behavior tree. An example includes: receiving a material bill including names of parts involved in a current assembly; obtaining a mechanical drawing of each part in the material bill; establishing multiple candidate pairings based on obtained mechanical drawings, wherein each of the multiple candidate pairings is composed of mechanical drawings of two parts; matching each of the multiple candidate pairings with each of pre-established regular pairings and regarding candidate pairings each of which matches a regular paring as target candidate pairings; for each target candidate pairing, adding assembly process information of a regular pairing matching the target candidate pairing to the target candidate pairing; and based on the assembly process information of all target candidate pairings, constructing a requirement behavior tree corresponding to a whole assembly process of the current assembly according to behavior tree syntax.

9 Claims, 7 Drawing Sheets

(56)                References Cited

U.S. PATENT DOCUMENTS

| 2019/0147317 | A1 | 5/2019 | Divekar et al. |
| 2022/0035966 | A1 | 2/2022 | McMinn |

OTHER PUBLICATIONS

Extended European Search Report, Application No. 22952552.2, 9 pages, Oct. 22, 2025.

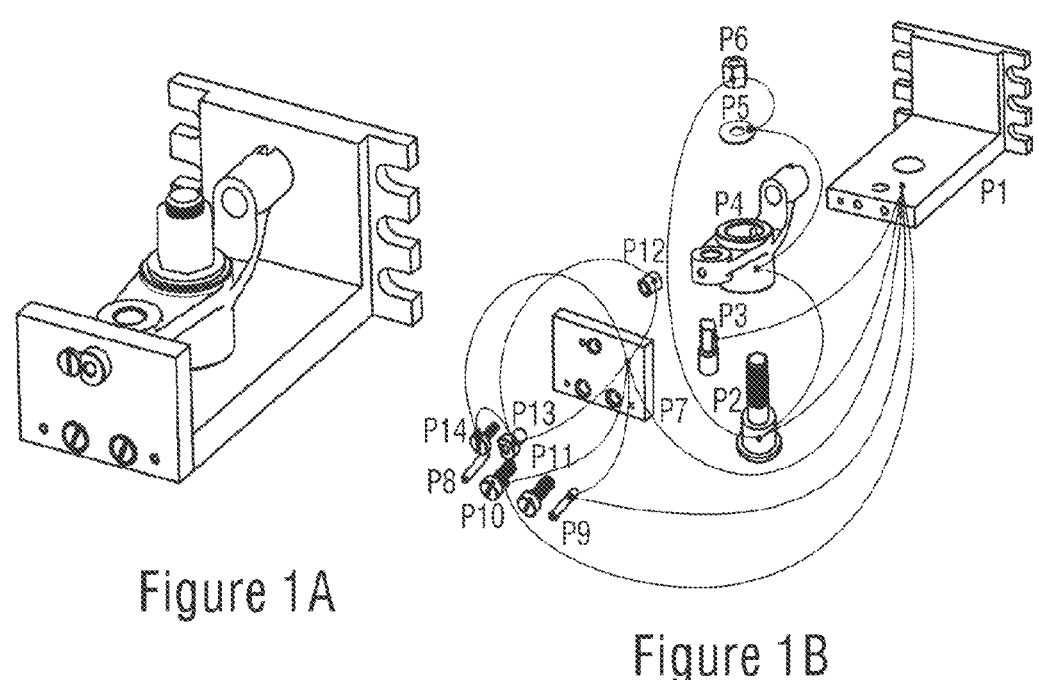
Figure 1A
Figure 1B
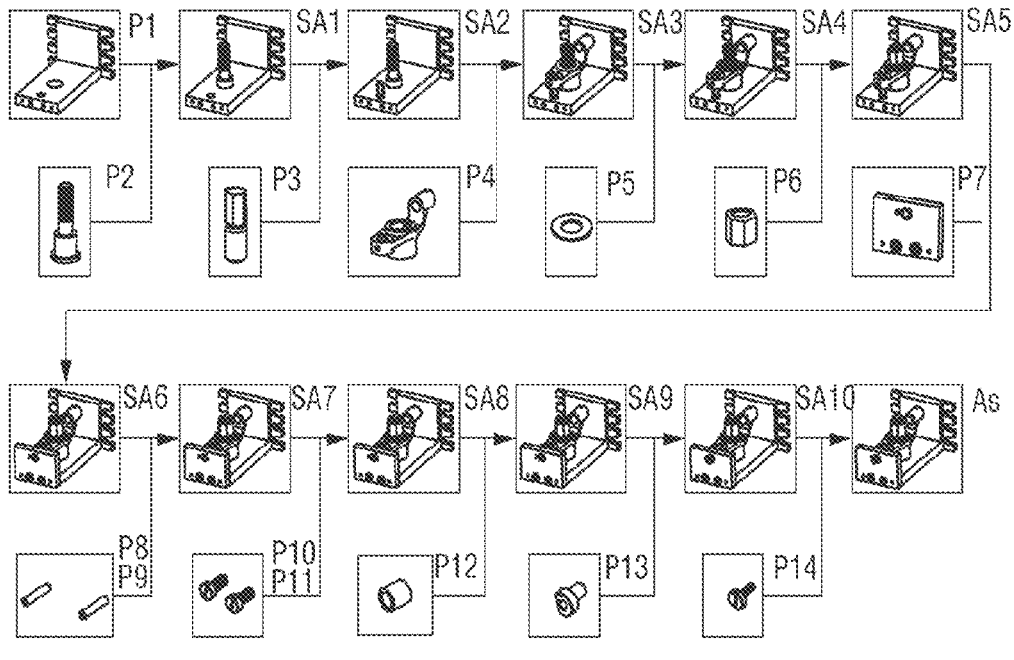
Figure 1C

Fixture fix P2
Robot pick P6
Robot screw P6 to P2

METHOD, DEVICE AND STORAGE MEDIUM FOR CONSTRUCTING REQUIREMENT BEHAVIOR TREE

CROSS-REFERENCE TO RELATED APPLICATIONS

This application is a U.S. National Stage Application of International Application No. PCT/CN2022/109201 filed Jul. 29, 2022, which designates the United States of America, the contents of which are hereby incorporated by reference in their entirety.

TECHNICAL FIELD

The present disclosure relates to industrial technologies. Various embodiments include methods, devices, and computer-readable storage medium for constructing a requirement behavior tree.

BACKGROUND

Requirements engineering is an approach to engineering production system at a more abstract level. It requires a high automation degree to convert the requirements into an executable production system. At least the conversion process should be much simplified. At present, the most popular requirement description tools adopt work instructions to describe the requirements. However, the work instructions are mostly in text format, and the text formats of different suppliers are very different. The main problem is that it is difficult to convert work instructions into structured data formats such as tree structure or graph structure. For the same reason, it is difficult to convert work instructions into software or program for building a production system. Therefore, in order to perform requirements engineering, a method for standardizing the generation process of requirement description and improving the automation of requirement description is required.

SUMMARY

Some embodiments of the teachings of the present disclosure include methods, devices, and computer-readable storage media for constructing requirement behavior tree to achieve the construction of requirement behavior tree in requirements engineering and improve the automation and efficiency of the construction of requirement behavior tree.

For example, some embodiments include a method for constructing requirement behavior tree comprising: receiving a material bill including names of parts involved in a current assembly; obtaining a mechanical drawing of each part in the material bill according to the names of parts in the material bill; establishing multiple candidate pairings based on obtained mechanical drawings, wherein each of the multiple candidate pairings is composed of mechanical drawings of two parts; matching each of the multiple candidate pairings with each of pre-established regular pairings, and regarding candidate pairings each of which matches a regular paring as target candidate pairings; for each target candidate pairing, adding assembly process information of a regular pairing matching the target candidate pairing to the target candidate pairing; based on the assembly process information of all target candidate pairings, constructing a requirement behavior tree corresponding to a whole assembly process of the current assembly according to behavior tree syntax.

As another example, some embodiments include a device for constructing requirement behavior tree comprising: a first module, configured to receive a material bill including names of parts involved in a current assembly; a second module, configured to obtain a mechanical drawing of each part in the material bill according to the names of parts in the material bill; a third module, configured to establish multiple candidate pairings based on obtained mechanical drawings, wherein each of the multiple candidate pairings is composed of mechanical drawings of two parts; a fourth module, configured to match each of the multiple candidate pairings with each of pre-established regular pairings, and regard candidate pairings each of which matches a regular paring as target candidate pairings; a fifth module, configured to, for each target candidate pairing, add assembly process information of a regular pairing matching the target candidate pairing to the target candidate pairing; a sixth module, configured to, based on the assembly process information of all target candidate pairings, construct a requirement behavior tree corresponding to a whole assembly process of the current assembly according to behavior tree syntax.

As another example, some embodiments include a device for constructing requirement behavior tree comprising: at least one memory, to store a computer program; and at least one processor, to call the computer program stored in the at least one memory to perform one or more of the method for constructing a requirement behavior tree described herein.

As another example, some embodiments include a non-transitory computer-readable storage medium storing a computer program to be executed by a processor to implement one or more of the methods for constructing a requirement behavior tree described herein.

Since the regular pairings of parts with assembly relationship are pre-established, and corresponding the assembly process information is attached to each regular pairing, and a plurality of candidate pairings are established for the current assembly, then each candidate pairing is matched with each pre-established regular pairing in turn, the assembly process information of the regular pairing matching the candidate pairing is attached to the corresponding candidate pairing, and then the requirement behavior tree corresponding to the whole assembly process is constructed according to the behavior tree syntax based on the assembly process information of all relevant candidate pairings, so that the construction of the requirement behavior tree in requirements engineering is achieved, and the automation and efficiency of the construction of the requirement behavior tree may be improved.

BRIEF DESCRIPTION OF THE DRAWINGS

For a better understanding of the present application, reference should be made to the Detailed Description below, in conjunction with the following drawings in which like reference numerals refer to corresponding parts throughout the figures. In the figures:

FIG. 1A is a schematic diagram illustrating an assembly of a component incorporating teachings of the present disclosure;

FIG. 1B is a schematic diagram illustrating an exploded view and assembly topology of the assembly shown in FIG. 1A;

FIG. 1C is a schematic diagram illustrating an exploded view of an assembly process of the assembly shown in FIG. 1A;

Figure 2:
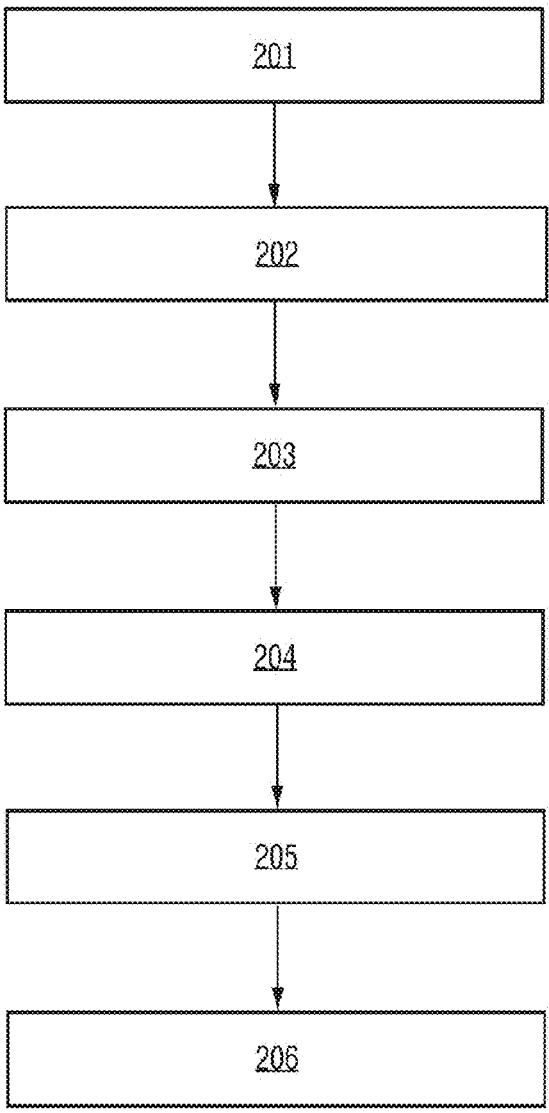
FIG. 2 is a flow diagram illustrating an example method for constructing a requirement behavior tree incorporating teachings of the present disclosure.

The reference numerals are as follows:

| Reference numeral | Object |
| --- | --- |
| P1~P14 | part |
| SA1~SA10 | sub-assembly |
| 201~207 | block |
| 601 | first module |
| 602 | second module |
| 603 | third module |
| 604 | fourth module |
| 605 | fifth module |
| 606 | sixth module |
| 607 | regular pairing library |
| 71 | memory |
| 72 | processor |
| 73 | bus |

DETAILED DESCRIPTION

Taking the assembly process as an example, FIG. 1A shows an example assembly, and FIG. 1B shows an exploded view and assembly topology of the assembly shown in FIG. 1A. FIG. 1C shows an exploded view of an assembly process of the assembly shown in FIG. 1A. In the figures, P1 to P14 are the parts constituting the assembly shown in FIG. 1A, and SA1 to SA 10 are the sub-assemblies obtained during the assembly process. As shown in FIG. 1C, in the assembly process, there is no process information such as screw tightening and part insertion, as well as system component information such as tools for performing the process and auxiliary materials used in the process. The above process information and system component information usually need to be manually added to the requirement description, thus the automatic generation of the requirement description cannot be achieved.

A behavior tree is a structured data format used to convert the requirement description into a software or program for building a production system. Teachings of the present disclosure include a technical scheme for using the behavior tree to represent the requirement description. Accordingly, the requirement description represented by the behavior tree can be called the requirement behavior tree.

Reference will now be made in detail to examples, which are illustrated in the accompanying drawings. In the following detailed description, numerous specific details are set forth in order to provide a thorough understanding of the present application. Also, the figures are illustrations of an example, in which assemblies shown in the figures are not necessarily essential for implementing the present disclosure. In other instances, well-known assemblies, components, and circuits have not been described in detail so as not to unnecessarily obscure aspects of the examples.

FIG. 2 is a flow diagram illustrating an example method for constructing a requirement behavior tree incorporating teachings of the present disclosure. As shown in FIG. 2, the method can include the following processes.

At block 201, regular pairings of assembly relationship are pre-established based on historical assembly data, and assembly process information is added for each regular pairing. The pre-established regular pairings may be stored in a database to form a regular pairing library. The regular pairing refers to a matching pairing of mechanical drawings of two parts with assembly relationship. That is to say, in this block, each regular pairing consists of two mechanical drawings of two parts with assembly relationship. The assembly relationship here can be, for example, that two parts in each regular pairing are connected to each other through the part surface, or that the spatial relationship between two parts in each regular pairing is conducive to the assembly. On the contrary, a pairing composed of two parts without assembly relationship can be called an irregular pairing. In the process of establishing regular pairings, it is necessary to discard the irregular pairings.

For example, the historical assembly data includes the assembly shown in FIG. 1A, FIGS. 3A to 3C show three regular pairings obtained when establishing regular pairings based on the assembly shown in FIG. 1A, namely, a first regular pairing 1, a second regular pairing 2 and a third regular pairing 3, that is, part P2 and part P4 form a regular pairing, part P2 and part P6 form a regular pairing, and part P2 and part P5 form a regular pairing.

Figures 3A, 3B, 3C:
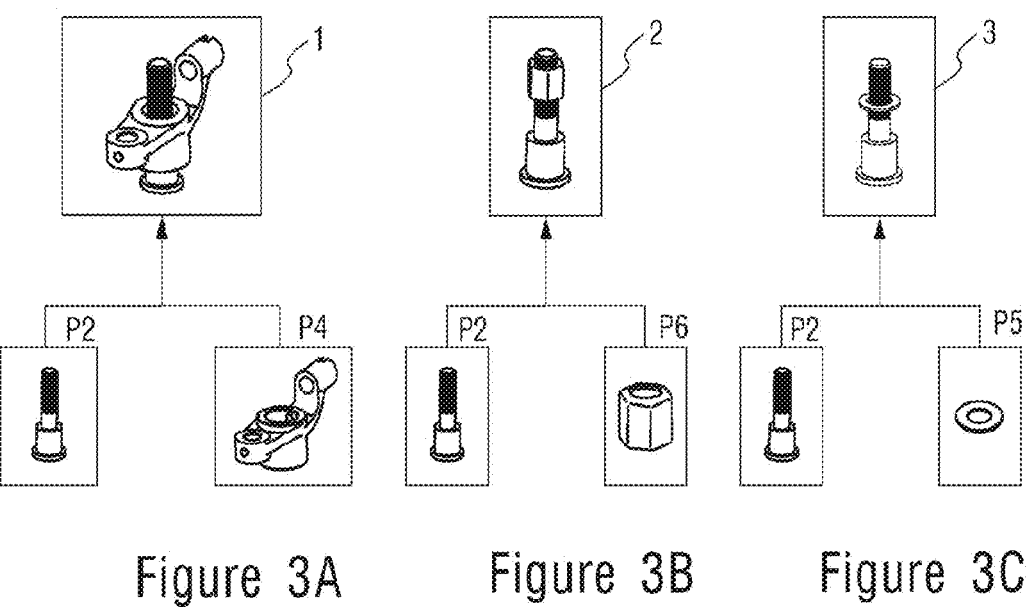
FIGS. 3A to 3C are schematic diagrams illustrating three regular pairings obtained when establishing regular pairings based on the assembly shown in FIG. 1A.

As shown in FIGS. 3A to 3C, the spatial relationship between the two parts in each regular pairing facilitates the assembly. Although there is no close connection between the two parts P2 and P5 in the pairing shown in FIG. 3C, there is an assembly relationship between them because part P5 has only one degree of freedom (DOF) that can leave part P2, or because part P2 can constrain the degree of freedom of part P5.

Figures 3D, 3E:
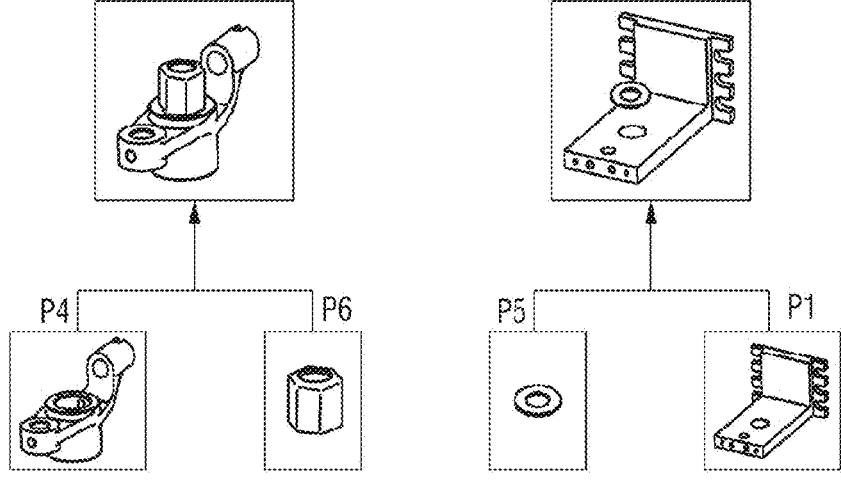
FIGS. 3D to 3F are schematic diagrams illustrating two of the irregular pairings obtained when establishing pairings based on the assembly shown in FIG. 1A.

FIG. 3D and FIG. 3E show two of the irregular pairings obtained when establishing pairings based on the assembly shown in FIG. 1A. As shown in FIG. 3D and FIG. 3E, the spatial relationship between the two parts in irregular pairings does not contribute to the assembly, so they need to be discarded.

At this block, when adding assembly process information for each regular pairing, the assembly process information can be described in any appropriate statement format. For example, it can adopt standard statement format, asset management shell (AAS) statement format, OPC UA statement format, etc. In this embodiment, the following statement format is considered:

Statement=(subject, predicate, object, context), in which the context is optional, that is, it can be null.

Figure 3F:
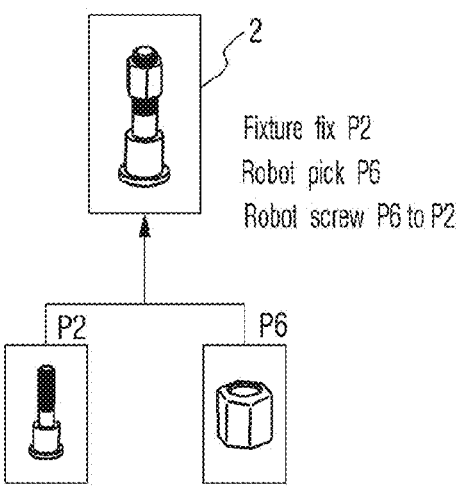

The second regular pairing 2 shown in FIG. 3B is taken as an example, the assembly process information added according to the above statement format may be shown in FIG. 3F, which includes the following information:

Fixture fix P2; /Where subject=fixture, predicate=fix, object=P2

Robot pick P6; /Where subject=robot, predicate=pick, object=P6

Robot screw P6 to P2. /Where subject=robot, predicate=screw, object=P6, context=to P2

In addition to the assembly process information shown in FIG. 3F, the following assembly process information may also be used:

Fixture fix P6;

Robot pick P2;

Robot screw P2 to P6.

The above statement format can easily build knowledge graphs for various computing purposes, and it is easy to attach all necessary assembly process information, for instance, an auxiliary material used (such as a fixture) and a tool/device (such as a robot). In this way, a regular pairing library with additional assembly process information can be obtained.

At block 202, a material bill including names of parts involved in a current assembly is received. The name of each part in this embodiment can be any name that can distinguish each part by using any one or any combination of letters, numbers, characters and words.

In some embodiments, the material bill at this block can be a table listing the names of the parts. For example, it is taken as an example that the assembly shown in FIG. 1A is the current assembly. The material bill may include the names "P1" to "P14" which are names of 14 parts assembled into the current assembly. The names of the 14 parts may not have a pairing relationship.

In some embodiments, the names of the parts in the material bill may also be combined into name pairs in advance according to the principle that there is an assembly relationship between the corresponding two parts. For example, "P2" and "P5" may be combined into a name pair, "P4" and "P5" may be combined into a name pair.

At block 203, according to the names of parts in the material bill, a mechanical drawing of each part in the material bill is obtained. The mechanical drawing may be CAD drawing. The mechanical drawing of each part can be obtained from a 3D product modeling system such as PLM system. At this block, the name of each part in the material bill can be used as an index to obtain the mechanical drawing of the part in the material bill.

At block 204, multiple candidate pairings are established based on obtained mechanical drawings, and each of the multiple candidate pairings is composed of mechanical drawings of two parts.

In some embodiments, when there is no pairing relationship between the names of parts in the material bill, multiple candidate pairings can be obtained by combining mechanical drawings in pairs, namely combining mechanical drawings of each two parts, based on the obtained mechanical drawings. At this time, there will be both regular candidate pairings and irregular candidate pairings in the obtained multiple candidate pairings. Alternatively, based on the obtained mechanical drawings, mechanical drawings of each two parts with assembly relationship can be combined to obtain multiple candidate pairings. At this time, the obtained multiple candidate pairings are regular candidate pairings.

When the names of parts in the material bill are combined into name pairs according to the principle that there is an assembly relationship between the corresponding two parts, in this block, based on the obtained mechanical drawings, mechanical drawings of two parts corresponding to each name pair can be combined to obtain multiple candidate pairings. At this time, the obtained multiple candidate pairings are regular candidate pairings.

At block 205, each of the multiple candidate pairings is matched with each of pre-established regular pairings in the regular pairing library, and candidate pairings each of which matches a regular paring are regarded as target candidate pairings, in which the similarity between a target candidate pairing and a corresponding regular pairing is greater than a set threshold. At this block, each candidate pairing in the multiple candidate pairings is compared with each regular pairing in the pre-established regular pairing library, and the candidate pairings, each of which the similarity with a regular pairing is greater than a set threshold, are regarded as the target candidate pairings.

At this block, when there are both regular candidate pairings and irregular candidate pairings in the multiple candidate pairings, the irregular candidate pairing cannot match a regular pairing, namely there is no a regular pairing that the similarity between the irregular candidate pairing and the regular pairing is greater than the set threshold. When the multiple candidate pairings are regular candidate pairings, basically each candidate pairing can match a regular pairing, namely there is a regular pairing that the similarity between the candidate pairing and the regular pairing is greater than the set threshold. At this block, a variety of matching algorithms can be used for specific implementation, such as grid comparison algorithm or boundary representation (BREP) comparison algorithm, and artificial intelligence methods can be used for specific calculation, such as graphical neural network (GNN).

At block 206, for each target candidate pairing, assembly process information of a regular pairing matching the target candidate pairing is added to the target candidate pairing.

At block 207, based on the assembly process information of all target candidate pairings, a requirement behavior tree corresponding to the current assembly is constructed according to behavior tree syntax. In this embodiment, an assembly process list corresponding to the whole assembly process of the current assembly can be obtained based on the assembly process information of all target candidate pairings, and then the requirement behavior tree corresponding to the whole assembly process can be constructed according to the behavior tree syntax based on the assembly process list.

Figure 4:
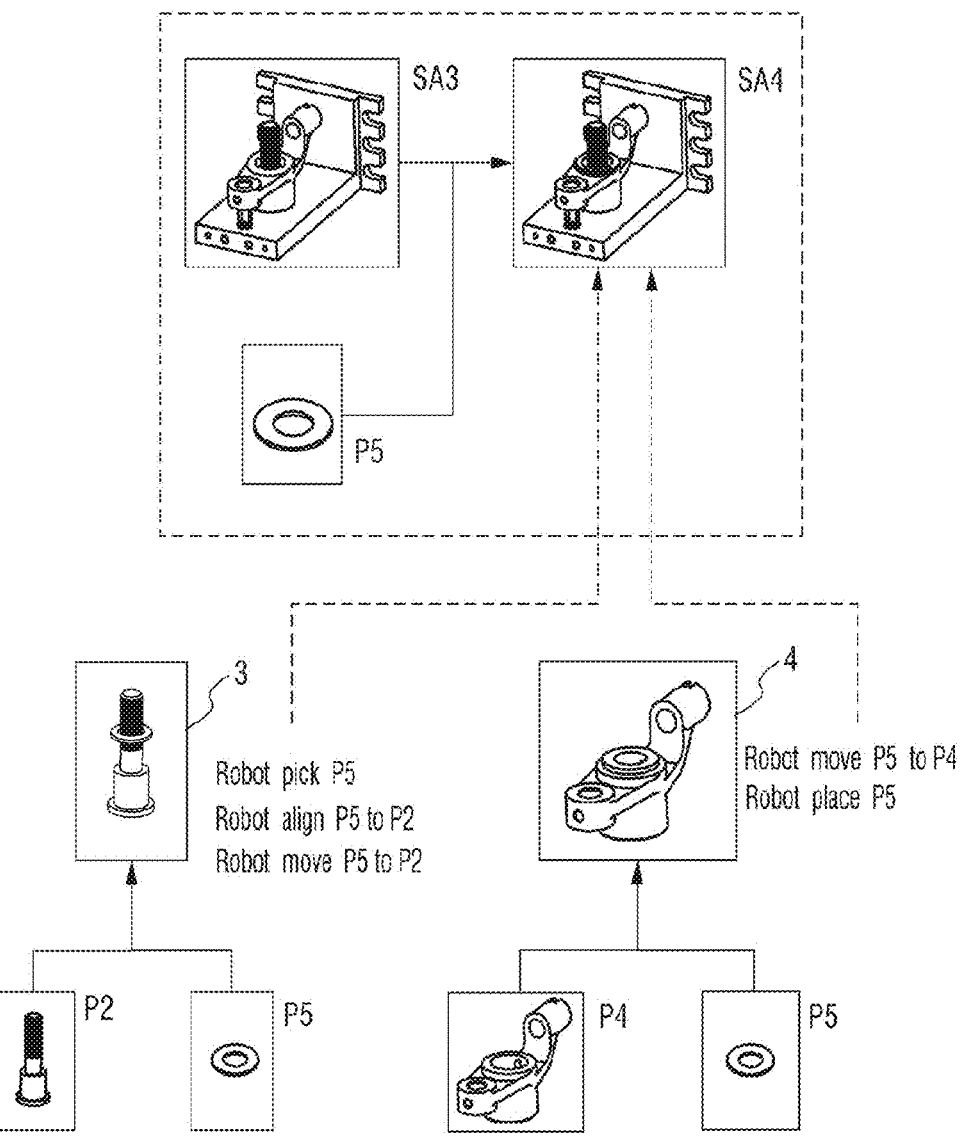
FIG. 4 is a schematic diagram illustrating regular pairings involved in a sub assembly process.

Taking the exploded view of the assembly process shown in FIG. 1C as an example, FIG. 4 shows a schematic diagram illustrating the regular pairings involved in a sub assembly process in FIG. 1C. As shown in FIG. 4, for the sub-assembly SA3+part p5=sub-assembly SA4, it involves two regular pairings, one is the third regular pairing 3 located on the left of FIG. 4, that is, the regular pairing composed of part P2 and part P5, and the other is a fourth regular pairing 4 located on the right of FIG. 4, that is, the regular pairing composed of part P4 and part P5. The assembly process information of the third regular pairing 3 includes: robot pick P5; robot align P5 to P2; robot move P5 to P2. The assembly process information of the fourth regular pairing 4 includes: robot move P5 to P4; robot place P5.

Based on the above assembly process information of the third regular pairing 3 and the fourth regular pairing 4, the assembly process list corresponding to the sub assembly process can be extracted and obtained, which includes: A1: robot pick P5; A2: robot align P5 to P2; A3: robot move P5 to P2; A4: robot move P5 to P4; A5: robot place P5.

Figure 5:
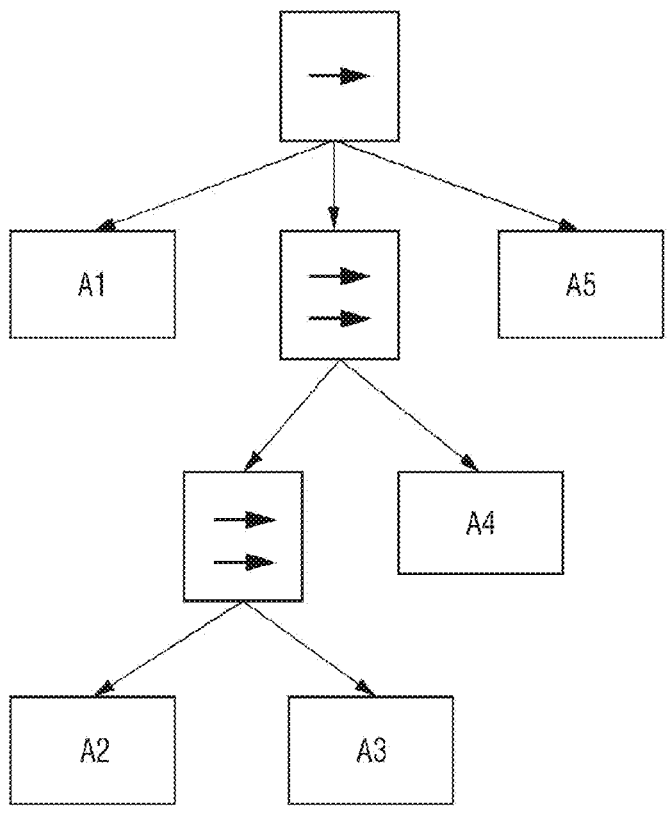
FIG. 5 is a schematic diagram illustrating a requirement behavior tree corresponding to a sub assembly process incorporating teachings of the present disclosure.

Then, based on the assembly process list, the requirement behavior tree corresponding to the sub assembly process can be constructed according to the behavior tree syntax as shown in FIG. 5. In FIG. 5, a single arrow represents a sequence node in the behavior tree, a double arrow represents a parallel node in the behavior tree, and a box represents an action node in the behavior tree, namely the assembly process corresponding to a1~a5 above.

Of course, in some embodiments, other behavior tree syntax may also be involved in the requirement behavior tree, for instance, a decorator node such as a condition node.

Example methods for constructing the requirement behavior tree are described in detail above, and devices for constructing the requirement behavior tree are described in detail below. The device for constructing requirement behavior tree in embodiments of the application can be used to implement one or more of the methods for constructing the requirement behavior tree described herein. For details not disclosed in the device description, please refer to the corresponding description of the methods.

Figure 6:
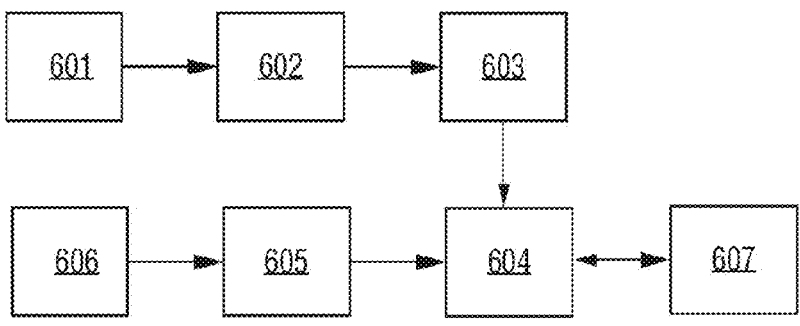
FIG. 6 is a schematic diagram illustrating an example device for constructing a requirement behavior tree incorporating teachings of the present disclosure.

FIG. 6 is a schematic diagram illustrating an example device for constructing a requirement behavior tree incorporating teachings of the present disclosure. As shown in FIG. 6, the device may include a first module 601, a second module 602, a third module 603, a fourth module 604, a fifth module 605, and a sixth module 606.

The first module 601 is configured to receive a material bill including names of parts involved in a current assembly.

The second module 602 is configured to obtain a mechanical drawing of each part in the material bill according to the names of parts in the material bill. For example, the second module 602 may obtain a mechanical drawing of each part by taking the name of the part as an index.

The third module 603 is configured to establish multiple candidate pairings based on obtained mechanical drawings, and each of the multiple candidate pairings is composed of mechanical drawings of two parts. When there is no pairing relationship between the names of parts in the material bill, the third module 603 combines mechanical drawings in pairs, namely combining mechanical drawings of each two parts, to obtain multiple candidate pairings based on the obtained mechanical drawings; or based on the obtained mechanical drawings, the third module 603 combines the mechanical drawings of each two parts with assembly relationship to obtain multiple candidate pairings. When the names of parts in the material bill are matched to form multiple name pairs according to the principle that there is an assembly relationship between the corresponding two parts, the third module 603 combines the mechanical drawings of two parts corresponding to each name pair based on the obtained mechanical drawings to obtain multiple candidate pairings.

The fourth module 604 is configured to match each of the multiple candidate pairings with each of pre-established regular pairings in a regular pairing library 607 and take candidate pairings each of which matches a regular paring as target candidate pairings, each regular pairing is composed of mechanical drawings of two parts with assembly relationship, and each regular pairing is added with corresponding assembly process information. In one embodiment, the assembly process information can be described in the following statement format: subject, predicate, object and context, in which the context is optional.

The fifth module 605 is configured to, for each target candidate pairing, add the assembly process information of a regular pairing matching the target candidate pairing to the target candidate pairing.

The sixth module 606 is configured to construct a requirement behavior tree corresponding to the whole assembly process of the current assembly according to the behavior tree syntax based on the assembly process information of all target candidate pairings. When specifically implemented, the sixth module 606 can extract an assembly process list corresponding to the whole assembly process of the current assembly based on the assembly process information of all target candidate pairings; and then, based on the assembly process list, a requirement behavior tree corresponding to the whole assembly process of the current assembly is constructed according to the behavior tree syntax.

In fact, the device for constructing a requirement behavior tree provided by this embodiment may be specifically implemented in various manners. For example, the device for constructing a requirement behavior tree may be compiled, by using an application programming interface that complies with a certain regulation, as a plug-in that is installed in an intelligent terminal or may be encapsulated into an application program for a user to download and use.

When compiled as a plug-in, the device for constructing a requirement behavior tree may be implemented in various plug-in forms such as ocx, dll, and cab. The device for constructing a requirement behavior tree provided by this embodiment of the present application may also be implemented by using a specific technology, such as a Flash plug-in technology, a RealPlayer plug-in technology, an MMS plug-in technology, a MIDI staff plug-in technology, or an ActiveX plug-in technology.

The methods for constructing a requirement behavior tree provided by this implementation may be stored in various storage mediums in an instruction storage manner or an instruction set storage manner. These storage mediums include, but are not limited to: a floppy disk, an optical disc, a DVD, a hard disk, a flash memory, a USB flash drive, a CF card, an SD card, an SDHC card, an MMC card, an SM card, a memory stick, and an xD card. An operating system operated in a computer can be made, not only by executing program code read by the computer from a storage medium, but also by using an instruction based on the program code, to implement some or all actual operations, so as to implement functions of any embodiment in the foregoing embodiments.

Figure 7:
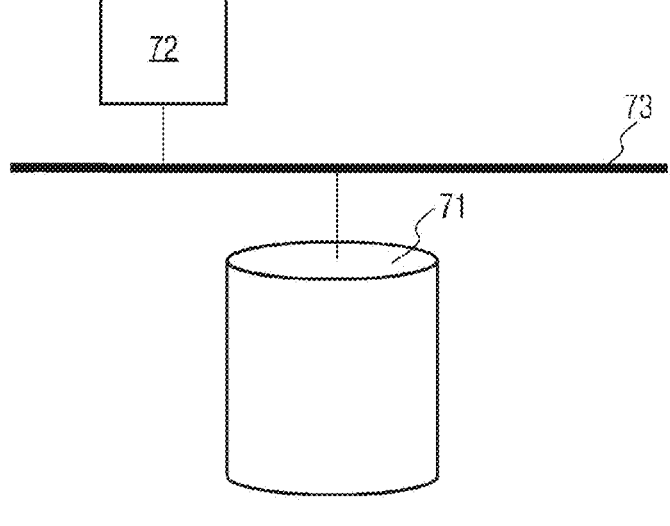
FIG. 7 is a schematic diagram illustrating another example device for constructing a requirement behavior tree incorporating teachings of the present disclosure.

For example, FIG. 7 is a schematic diagram illustrating another example device for constructing a requirement behavior tree incorporating teachings of the present disclosure. The device may be used to perform the method shown in FIG. 2, or to implement the device shown in FIG. 6. As shown in FIG. 7, the device may include at least one memory 71 and at least one processor 72. In addition, some other components may be included, such as communication port, input/output controller, network communication interface, etc. These components communicate through bus 73, etc.

At least one memory 71 is configured to store a computer program. In one example, the computer program can be understood to include various modules of the device shown in FIG. 6. In addition, at least one memory 71 may store an operating system or the like. Operating systems include but are not limited to: Android operating system, Symbian operating system, windows operating system, Linux operating system, etc.

At least one processor 72 is configured to call the computer program stored in at least one memory 71 to perform a method for constructing a requirement behavior tree incorporating teachings of the present disclosure. The processor 72 can be CPU, processing unit/module, ASIC, logic module or programmable gate array, etc. It can receive and send data through the communication port.

The I/O controller has a display and an input device, which is used to input, output and display relevant data.

As used herein, unless the context clearly supports exceptions, the singular forms "a" ("a", "an", "the") are intended to include the plural forms. It should also be understood that, "and/or" used herein is intended to include any and all possible combinations of one or more of the associated listed items.

The embodiments described herein are only used for description, and do not represent the merits of the implementations. The foregoing description, for purpose of explanation, has been described with: reference to specific examples. However, the illustrative discussions above are not intended to be exhaustive or to limit the present application to the precise forms disclosed.

Many modifications and variations are possible in view of the above teachings. The examples were chosen and described to best explain the principles of the present application and its practical applications, to thereby enable others skilled in the art to best utilize the present application and various examples with various modifications as are suited to the particular use contemplated.

What is claimed is:

1. A method for building a production system using a requirement behavior tree, the method comprising:

receiving a material bill including names of parts involved in a current assembly;

obtaining a mechanical drawing of each part in the material bill based on the names;

establishing multiple candidate pairings based on obtained mechanical drawings, wherein each of the multiple candidate pairings is composed of mechanical drawings of two parts;

matching each of the multiple candidate pairings with each of pre-established regular pairings and regarding candidate pairings each of which matches a regular paring as target candidate pairings;

for each target candidate pairing, adding assembly process information of a regular pairing matching the target candidate pairing to the target candidate pairing;

based on the assembly process information of all target candidate pairings, constructing a requirement behavior tree corresponding to a whole assembly process of the current assembly according to behavior tree syntax; and using the requirement behavior tree to build a production system including automated assembly processes, lists of tools for performing the processes, and auxiliary materials used in the processes.

2. The method according to claim 1, wherein:

there is no pairing relationship between the names of parts in the material bill; and establishing multiple candidate pairings based on obtained mechanical drawings comprises:

based on the obtained mechanical drawings, obtaining multiple candidate pairings by combining mechanical drawings in pairs; or based on the obtained mechanical drawings, obtaining multiple candidate pairings by combining mechanical drawings of each two parts with assembly relationship.

3. The method according to claim 1, further comprising:

combining the names in name pairs according to the principle that there is an assembly relationship between corresponding two parts; and wherein establishing multiple candidate pairings based on obtained mechanical drawings comprises based on the obtained mechanical drawing, obtaining multiple candidate parings by combining mechanical drawings of two parts corresponding to each name pair.

4. The method according to claim 1, wherein a statement format of the assembly process information is: subject, predicate, object, and context;

wherein the context is optional.

5. The method according to claim 1, wherein based on the assembly process information of all target candidate pairings, constructing a requirement behavior tree corresponding to the whole assembly process of the current assembly according to the behavior tree syntax comprises:

based on the assembly process information of all target candidate pairings, obtaining an assembly process list corresponding to the whole assembly process of the current assembly; and based on the assembly process list, constructing a requirement behavior tree corresponding to the whole assembly process of the current assembly according to behavior tree syntax.

6. A device for constructing a requirement behavior tree, the device comprising:

a first module to receive a material bill including names of parts involved in a current assembly;

a second module to obtain a mechanical drawing of each part in the material bill according to the names of parts in the material bill;

a third module to establish multiple candidate pairings based on obtained mechanical drawings, wherein each of the multiple candidate pairings is composed of mechanical drawings of two parts;

a fourth module to match each of the multiple candidate pairings with each of pre-established regular pairings and regard candidate pairings each of which matches a regular paring as target candidate pairings;

a fifth module to, for each target candidate pairing, add assembly process information of a regular pairing matching the target candidate pairing to the target candidate pairing; and a sixth module to, based on the assembly process information of all target candidate pairings, construct a requirement behavior tree corresponding to a whole assembly process of the current assembly according to behavior tree syntax.

7. The device according to claim 6, wherein:

there is no pairing relationship between the names of parts in the material bill; and the third module, based on the obtained mechanical drawings:

obtains multiple candidate pairings by combining mechanical drawings in pairs; or obtains multiple candidate pairings by combining mechanical drawings of each two parts with assembly relationship.

8. The device according to claim 6, wherein:

the names of parts in the material bill are combined in name pairs according to the principle that there is an assembly relationship between corresponding two parts; and the third module, based on the obtained mechanical drawing, obtains multiple candidate parings by combining mechanical drawings of two parts corresponding to each name pair.

9. A device for building a production system using a requirement behavior tree, characterized in that, comprises:

at least one memory, to store a computer program; and at least one processor, to call the computer program stored in the at least one memory to construct a requirement behavior tree by:

receiving a material bill including names of parts involved in a current assembly;

obtaining a mechanical drawing of each part in the material bill based on the names;

establishing multiple candidate pairings based on obtained mechanical drawings, wherein each of the multiple candidate pairings is composed of mechanical drawings of two parts;

matching each of the multiple candidate pairings with each of pre-established regular pairings and regarding candidate pairings each of which matches a regular paring as target candidate pairings;

for each target candidate pairing, adding assembly process information of a regular pairing matching the target candidate pairing to the target candidate pairing;

based on the assembly process information of all target candidate pairings, constructing a requirement behavior tree corresponding to a whole assembly process of the current assembly according to behavior tree syntax; and using the requirement behavior tree to build a production system including automated assembly processes, lists of tools for performing the processes, and auxiliary materials used in the processes.

\* \* \* \* \*